US011065193B2

(12) United States Patent
Elsen-Wahrer et al.

(10) Patent No.: US 11,065,193 B2
(45) Date of Patent: Jul. 20, 2021

(54) COMPOSITIONS AND TREATMENTS FOR KERATINOUS MATERIALS PROVIDING DAMAGE PROTECTION AND SENSORIAL BENEFITS

(71) Applicant: L'OREAL, Paris (FR)

(72) Inventors: Andrea Elsen-Wahrer, Linden, NJ (US); Jim Singer, South Orange, NJ (US); Paul Bonvallet, Westfield, NJ (US); Zhi Pan, Ridgewood, NJ (US)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 15/476,477

(22) Filed: Mar. 31, 2017

(65) Prior Publication Data
US 2018/0280286 A1 Oct. 4, 2018

(51) Int. Cl.
A61K 8/97 (2017.01)
A61K 8/60 (2006.01)
A61K 8/368 (2006.01)
A61K 8/49 (2006.01)
A61K 8/44 (2006.01)
A61K 8/22 (2006.01)
A61K 8/19 (2006.01)
A61K 8/24 (2006.01)
A61K 8/34 (2006.01)
A61K 8/42 (2006.01)
A61K 8/23 (2006.01)
A61Q 5/08 (2006.01)
A61Q 5/10 (2006.01)
A61K 8/365 (2006.01)
A61K 8/36 (2006.01)
A61Q 5/06 (2006.01)

(52) U.S. Cl.
CPC ............... A61K 8/97 (2013.01); A61K 8/19 (2013.01); A61K 8/22 (2013.01); A61K 8/23 (2013.01); A61K 8/24 (2013.01); A61K 8/342 (2013.01); A61K 8/345 (2013.01); A61K 8/36 (2013.01); A61K 8/365 (2013.01); A61K 8/368 (2013.01); A61K 8/42 (2013.01); A61K 8/44 (2013.01); A61K 8/498 (2013.01); A61K 8/4913 (2013.01); A61K 8/602 (2013.01); A61Q 5/065 (2013.01); A61Q 5/08 (2013.01); A61Q 5/10 (2013.01); A61K 2800/4322 (2013.01); A61K 2800/522 (2013.01); A61K 2800/882 (2013.01)

(58) Field of Classification Search
CPC ...................................................... A61Q 5/08
See application file for complete search history.

(56) References Cited

U.S. PATENT DOCUMENTS 8,357,356 B2 1/2013 Zaeska et al.
9,265,717 B1 2/2016 DeGeorge et al.
2002/0035759 A1* 3/2002 Pratt .................. A61K 8/35
8/405
2006/0064823 A1 3/2006 Marsh et al.
2006/0165636 A1 7/2006 Hasebe et al.
2006/0182697 A1 8/2006 Lalleman et al.
2007/0157399 A1 7/2007 Nobuto et al.
2008/0019957 A1 1/2008 Neudecker et al.
2009/0042846 A1* 2/2009 Gupta .................. A61K 8/63
514/173
2009/0169652 A1 7/2009 Osborne
2009/0265865 A1* 10/2009 Lockridge ............. A61K 8/365
8/406
2009/0317349 A1* 12/2009 Zaeska .................. A61K 8/37
424/70.2
2011/0035885 A1 2/2011 Zhang et al.
2011/0130704 A1* 6/2011 Baldo ................... A61K 8/37
604/20
2012/0102662 A1* 5/2012 Wood .................... A61K 8/19
8/405
2013/0042883 A1* 2/2013 DeGeorge ............ A61K 8/22
132/208
2013/0142748 A1 6/2013 Tamura et al.
2013/0149264 A1 6/2013 Nguyeni et al.
2013/0177516 A1 7/2013 Tamura et al.
2014/0045777 A1* 2/2014 Potin .................... A61K 8/35
514/27
2015/0238391 A1* 8/2015 Schoepgens ........... A61K 8/25
424/62

FOREIGN PATENT DOCUMENTS

EP 2535087 A2 12/2012
JP H08231348 9/1996
(Continued)

OTHER PUBLICATIONS

Gao et al., "Free radical scavenging and antioxidant activities of flavonoids extracted from the radix of Scutellaria baicalensis Georgi", Biochimicia et Biophysica Acta, 1999, 1472, 643-650.*
Database GNPD [Online] MINTEL; Oct. 1, 2010, XP002781991, Database accession No. 1421513 the whole document.
International Search Report for PCT/US2018/025527 dated Jul. 10, 2018.

Primary Examiner — Gina C Justice
(74) Attorney, Agent, or Firm — McNees Wallace & Nurick LLC

(57) ABSTRACT

The present invention relates to a cosmetic treatment and processes for treating keratinous materials, in particular for altering the color of hair as in hair coloration, hair color lightening or removal, and treatment of artificially colored hair, wherein the composition can include at least one antioxidant, applied separately or combined or combinable with one or more components of a color altering system in amounts sufficient to confer protection when the treatment composition is applied to keratinous material and thereby enhance and protect one or more sensorial features, and preserve the mechanical properties and native amino acid structure of the keratinous material.

25 Claims, No Drawings

(56) References Cited

FOREIGN PATENT DOCUMENTS

| | | | |
|---|---|---|---|
| JP | 2004210658 A | | 7/2004 |
| JP | 2006193512 A | * | 7/2006 |
| KR | 20140056990 A | * | 5/2014 |
| KR | 101451337 B1 | | 10/2014 |
| WO | 2010007247 A2 | | 1/2010 |
| WO | 2013071192 A1 | | 5/2013 |
| WO | 2014059225 A1 | | 4/2014 |
| WO | 2014074812 A1 | | 5/2014 |

* cited by examiner

COMPOSITIONS AND TREATMENTS FOR KERATINOUS MATERIALS PROVIDING DAMAGE PROTECTION AND SENSORIAL BENEFITS

FIELD OF THE INVENTION

The present disclosure is directed to compositions for conferring protective benefits to keratinous materials, particularly hair, the composition having components that stabilize and ameliorate the damaging effects of oxidants and oxidizing agents. More specifically, the present invention is directed to compositions and kits for altering the color of hair, including bleaches, developers, optionally coloring agents, and antioxidant compositions, particularly antioxidant compositions that comprise one or more antioxidant compounds selected from polyphenols, wherein the antioxidant composition may be combined or combinable with one or more of the components of the hair color altering compositions.

BACKGROUND OF THE INVENTION

The process of changing the color of hair can involve either depositing a color onto the hair which provides a different shade or color to the hair, or lifting the color of the hair, such as for example, from a dark brown shade to a medium brown or a light brown shade or lighter, or removing the color of hair. Hair color can be deposited on hair using permanent, semi-permanent, or temporary hair coloring products.

Conventional hair color altering products include coloring or dyeing products comprising colorants chosen from oxidation precursors (oxidation dye precursors in color formulations), which are more commonly referred to as oxidation bases. These oxidation dye precursors are colorless or weakly colored compounds which, when combined with oxidizing products, give rise to hair color changes by a process of oxidative condensation. The oxidizing products conventionally use peroxides such as hydrogen peroxide as developers. Such products may also contain ammonia or other alkalizing agents such as monoethanolamine which causes the hair shaft to swell, thus allowing the small oxidative molecules to penetrate the cuticle and cortex before the oxidation condensation process is completed. In the presence of colored dyes, colored complexes from the oxidative reaction are trapped inside the hair fiber, thereby permanently altering the color of the hair. Other colorants may be chosen from direct dyes, natural colorants, and pigments.

Other hair color altering products include color lifting or color lightening or bleaching products. Such products generally contain oxidants such as persalt compounds such as persulfate compounds (as in bleaches) and/or oxidizing agents such as air (oxygen), enzymes and peroxides, for example, hydrogen peroxide (as in developers). A hair coloring or dyeing product can also lift or lighten the color of hair while depositing color.

Unfortunately, cosmetic compositions used for color lifting and color deposition present challenges. Oxidizing agents and oxidants are known to cause damage to the hair that reduces its tensile strength and flexibility, making it brittle and prone to breakage. These effects, in turn, confer negative aesthetic and sensorial properties, including loss of moisture, reduced combability, loss of natural softness, reduced elasticity, and reduced shine. A variety of products include components that may either coat the hair either before, during or after treatment. And others include acids that are intended to neutralize the strong bases in the oxidizing agents. The benefits of these products vary, and often come with negatives such as diminished processing speed, diminished color uptake or lift, and insufficient protection from damage. Thus, there remains a need for hair color altering products and/or hair care and treatment products that provide desirable post treatment hair quality.

BRIEF SUMMARY OF THE INVENTION

The invention provides, in various embodiments, compositions and kits formulated for various modes of delivery to a keratinous material to one or more of: confer protection to the keratinous material from the damaging effects of oxidants and oxidizing agents in the color altering system; enhance and protect one or more sensorial features of the keratinous material treated with oxidizing agents in the color altering system; and protect and preserve the mechanical properties and native amino acid structure of the hair. The compositions and kits include a plurality of components, including an antioxidant composition comprising one or more antioxidant compounds, and at least one color altering system component selected from the group consisting of: a bleach; a developer; a colorant selected from oxidative dye precursors and direct dyes; a bleach and a developer; and a colorant selected from oxidative dye precursors and direct dyes and a developer.

In the various embodiments, one or more of each of the antioxidant and the components of the color altering system may be provided separately packaged, or packaged in combinations, such as for example a combination of an antioxidant and a bleach and a developer, or in another example, a combination of an antioxidant and a bleach, or in another example a combination of an antioxidant and a colorant, and in yet another example, a combination of an antioxidant and a developer. According to such various embodiments, the various separately packaged or combined components that include an antioxidant, a bleach or colorant, and a developer, may be mixed prior to application to a keratinous material, or may be individually applied to the keratinous material in a particular sequence or order, or at the same time.

Thus, in some embodiments, the invention provides a treatment composition comprising (a) an antioxidant composition comprising at least one antioxidant compound, and a color altering system including at least one of (b) a bleach, (c) a developer, and (d), a colorant which may be selected from oxidative dye precursors, wherein, according to methods of use of the composition, (a) and one or more of (b) and (c), or (a) and one or more of (c) and (d) are combined or combinable by one or more of sequential application to a keratinous material or premixing followed by application to a keratinous material.

According to some embodiments, the at least one antioxidant compound is selected from polyphenols, ascorbic acid, dihydrochalone, and zinc PCA. In some particular embodiments, the antioxidant compound is a polyphenol chosen from baicalin, ferulic acid, pine bark extract, polydatin and ellagic acid. In accordance with the various embodiments, the antioxidant composition comprising the at least one antioxidant compound includes one or more auxiliaries or additives.

In one alternate and exemplary embodiment, a treatment composition includes an antioxidant composition that comprises at least one antioxidant compound selected from polyphenols, a bleach, and a developer. In another alternate and exemplary embodiment, a treatment composition includes an antioxidant composition that comprises at least one antioxidant compound selected from polyphenols, a colorant selected from oxidative dye precursors and direct dyes, and a developer. In accordance with these alternate embodiments, the treatment composition includes from about 0.1 to about 5.0%, by weight, based on the total weight of the composition, of the at least one antioxidant compound. In some embodiments, the treatment composition includes from about 0.1 to about 5.0%, by weight, based on the total weight of the composition comprising the antioxidant composition and either the bleach component or the colorant component of the color altering system (thus not including the developer). In some embodiments, the treatment composition includes from about 0.1 to about 5.0%, by weight, based on the total weight of the composition comprising the antioxidant composition and the developer component of the color altering system (thus not including a bleach or colorant component). In accordance with the various embodiments, the treatment composition includes one or more auxiliaries or additives.

In some particular embodiments, the treatment composition includes from about 0.1 to about 5.0%, or from about 0.7 to about 2.3%, or at least 0.5%, or no more than 2.5% baicilin by weight, based on the total weight of the composition comprising the antioxidant composition and the bleach or colorant component of the color altering system (thus not including the developer).

In some particular embodiments, the treatment composition includes from about 0.1 to about 5.0%, or from about 0.7 to about 2.3%, or at least 0.5%, or no more than 2.5% pine bark extract by weight, based on the total weight of the composition comprising the antioxidant composition and the bleach or colorant component of the color altering system (thus not including the developer).

In some particular embodiments, the treatment composition includes from about 0.1 to about 3.0%, or from about 0.7 to about 1.2%, or at least 0.5%, or no more than 2.0% ferulic acid by weight, based on the total weight of the composition comprising the antioxidant composition and the bleach or colorant component of the color altering system (thus not including the developer).

In some particular embodiments, the treatment composition includes from about 0.1 to about 5.0%, or from about 0.9 to about 1.8%, or at least 0.5%, or no more than 2.5% ellagic acid by weight, based on the total weight of the composition comprising the antioxidant composition and the bleach or colorant component of the color altering system (thus not including the developer).

In another exemplary embodiment, a method of treating a keratinous material chosen from hair, eyelashes and eyebrows includes applying to the keratinous material a composition including (a) an antioxidant composition comprising at least one antioxidant compound, and (b) a bleach component of the color altering system, and (c) a developer component of the color altering system, wherein, according to methods of use of the composition, (a) and one or more of (b) and (c) are combined or combinable by one or more of separate and sequential application to the keratinous material or by premixing followed by application to the keratinous material, the combination in an amount effective to impart one more of protection to the keratinous material from the damaging effects of oxidants and oxidizing agents, enhance and protect one or more sensorial features of the treated keratinous material, and enhance and extend the stability of hair color altering compositions, wherein the antioxidant compound is present at a concentration in the treatment composition from about 0.1 to about 5.0%, by weight, based on the total weight of the composition, or from about 0.1 to about 5.0%, by weight, based on the total weight of the composition comprising the antioxidant composition and the bleach component of the color altering system (thus not including the developer).

In some embodiments, the at least one antioxidant compound of the antioxidant composition is applied together with the color altering system. In some such embodiments, the antioxidant compound of the antioxidant composition is applied separately from each of the bleach and the developer of the color altering system. Thus, in some embodiments, the antioxidant compound of the antioxidant composition is applied alone, at a time preceding application of any component of the color altering system. In some embodiments, the antioxidant compound of the antioxidant composition is applied together with only the bleach of the color altering system, and the developer of the color altering system is separately applied. In some other embodiments, the antioxidant compound of the antioxidant composition is applied together with only the developer of the color altering system, and the bleach of the color altering system is separately applied.

In another exemplary embodiment, a method of treating a keratinous material chosen from hair, eyelashes and eyebrows includes applying to the keratinous material a composition including (a) an antioxidant composition comprising at least one antioxidant compound, and (b) a colorant component of the color altering system, and (c) a developer component of the color altering system, wherein, according to methods of use of the composition, (a) and one or more of (b) and (c) are combined or combinable by one or more of separate and sequential application to the keratinous material or by premixing followed by application to the keratinous material, the combination in an amount effective to impart one more of protection to the keratinous material from the damaging effects of oxidizing agents, enhance and protect one or more sensorial features of the keratinous material treated with oxidizing agents, and enhance and extend the stability of color or dye compositions comprising oxidizing agents, wherein the antioxidant compound is present at a concentration in the treatment composition from about 0.1 to about 5.0%, by weight, based on the total weight of the composition, or from about 0.1 to about 5.0%, by weight, based on the total weight of the composition comprising the antioxidant composition and the colorant component of the color altering system (thus not including the developer).

In some embodiments, the at least one antioxidant compound of the antioxidant composition is applied together with the color altering system. In some such embodiments, the antioxidant compound of the antioxidant composition is applied separately from each of the colorant and the developer of the color altering system. Thus, in some embodiments, the antioxidant compound of the antioxidant composition is applied alone, at a time preceding application of any component of the color altering system. In some embodiments, the antioxidant compound of the antioxidant composition is applied together with only the colorant of the color altering system, and the developer of the color altering system is separately applied. In some other embodiments, the antioxidant compound of the antioxidant composition is applied together with only the developer of the color altering system, and the colorant of the color altering system is separately applied.

In some embodiments, the keratinous material is heated and the antioxidant composition is applied to the keratinous material before heating or during heating or after heating the material, followed by application of the color altering system. In some other particular embodiments, the keratinous material is heated and the antioxidant composition comprising at least one antioxidant compound is applied to the keratinous material together with only one of the bleach and the developer before heating or during heating or after heating the material, followed by application of the other component(s) of the color altering system. In some embodiments, one or more of the components of the composition is heated and then applied to the keratinous material.

The present invention is also directed to kits and methods of their use for cosmetic treatment of keratinous material, such as hair, by applying the above-disclosed compositions onto a surface of the keratinous material, such as the cuticle of hair fibers, in a single step or in a stepwise fashion. According to some embodiments, the kit includes separate packaging of one or more of each of the antioxidant composition, a bleach component of the color altering system, a developer component of the color altering system, and a colorant of the color altering system, and optionally one or more of other agents that include, but are not limited to, a relaxing process agent, and a straightening process agent, optionally together with other additives and auxiliaries.

Other features and advantages of the present invention will be apparent from the following more detailed description of the preferred embodiment which illustrates, by way of example, the principles of the invention.

This disclosure describes exemplary embodiments in accordance with the general inventive concepts and is not intended to limit the scope of the invention in any way. Indeed, the invention as described in the specification is broader than and unlimited by the exemplary embodiments set forth herein, and the terms used herein have their full ordinary meaning.

DETAILED DESCRIPTION OF THE INVENTION

Other than in the operating examples, or where otherwise indicated, all numbers expressing quantities of ingredients and/or reaction conditions are to be understood as being modified in all instances by the term "about," meaning within 10% of the indicated number (e.g. "about 10%" means 9%-11% and "about 2%" means 1.8%-2.2%).

All percentages and ratios are calculated by weight unless otherwise indicated. All percentages are calculated based on the total composition unless otherwise indicated. Generally, unless otherwise expressly stated herein, "weight" or "amount" as used herein with respect to the percent amount of an ingredient refers to the amount of the raw material comprising the ingredient, wherein the raw material may be described herein to comprise less than and up to 100% activity of the ingredient. Therefore, weight percent of an active in a composition is represented as the amount of raw material containing the active that is used, and may or may not reflect the final percentage of the active, wherein the final percentage of the active is dependent on the weight percent of active in the raw material.

It should be understood that the precise numerical values used in the specification, including the examples and claims, form additional embodiments of the invention, and are intended to include any ranges which can be narrowed to any to end points disclosed within the exemplary ranges and values provided. Efforts have been made to ensure the accuracy of the numerical values disclosed. However, any measured value can inherently contain certain errors resulting from the standard deviation found in its respective measuring technique.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"Active material" or "weight" as used herein with respect to the percent amount of an ingredient or raw material, refers to 100% activity of the ingredient or raw material. All percentages and ratios are calculated by weight unless otherwise indicated. All percentages are calculated based on the total composition unless otherwise indicated. Generally, unless otherwise expressly stated herein, "weight" or "amount" as used herein with respect to the percent amount of an ingredient refers to the amount of the raw material comprising the ingredient, wherein the raw material may be described herein to comprise less than and up to 100% activity of the ingredient. Therefore, weight percent of an active in a composition is represented as the amount of raw material containing the active that is used, and may or may not reflect the final percentage of the active, wherein the final percentage of the active is dependent on the weight percent of active in the raw material.

The term "altering the color" and variations thereof as used herein may refer to dyeing or coloring hair or depositing color onto the hair or lightening the color of hair, and thus, include, lifting color, or removing color, as well as changing color.

"Antioxidant" refers to a chemical compound, an enzyme or other organic molecule which prevents free radicals from causing oxidation of molecules such as are found in keratinous materials. The antioxidant, by reacting with the oxidant, protects such molecules from being damaged. Examples of antioxidants include without limitation, polyphenols, vitamins A, C, E, carotenoids, and certain minerals. In some specific examples, antioxidants include ascorbic acid, dihydrochalone, zinc PCA, baicalin, ferulic acid, pine bark extract, polydatin and ellagic acid.

As used herein, the terms "applying a composition onto keratin fibers" and "applying a composition onto hair" and variations of these phrases are intended to mean contacting the fibers or hair, with at least one of the compositions of the invention, in any manner. A treatment process, such as a one-step or multi-step treatment process refers to the number of steps of applying a composition onto keratin fibers. For example, a one-step treatment process involves a single application, and a two-step process involves two separate applications.

"At least one," as used herein, means one or more and thus includes individual components as well as mixtures/combinations.

A "Color altering system" according to the disclosure is an oxidizing lifting or coloring composition that includes components of a typical coloring or lifting or highlighting or bleaching system, the system including (i) Bleach composition containing oxidizing agents+Developer (for lift); and in some embodiments (ii) a Dye composition+Developer (for lift and color deposit) one or more colorant or a dye, and optionally containing any one or more conventionally used carriers, additives and auxiliaries. As further described herein, the components of a color altering system are also referred to as a bleach, a developer, and a dye or colorant, it being understood that these references contemplate these referenced components as they are conventionally used and understood in the context of color altering systems that are well known in the art. In accordance with the inventive embodiments, any one or more components of the color altering system may be provided separate from or premixed with an antioxidant to provide an inventive composition or kit hereunder.

"Color deposit" refers to refers to a visually distinguishable color effect imparted to a keratinous material by the application of a composition including a colorant or dye to the substrate, resulting in permanent or semi-permanent or demi-permanent, i.e., not "wash out" or "try on" color application or composition.

The term "comprising" (and its grammatical variations) as used herein is used in the inclusive sense of "having" or "including" and not in the exclusive sense of the terms "consisting only of," "consisting essentially of" and "consisting of."

"Cosmetically acceptable" means compatible with any keratinous tissue. For example, "cosmetically acceptable carrier" means a carrier that is compatible with any keratinous tissue.

"Keratinous material," as used herein, includes, but is not limited to, skin, hair, and nail, and also includes "keratinous substrate," "keratinous tissue" and "keratinous fibers," which may be human keratinous material, and may be chosen from, for example, hair, such as hair on the human head, or hair comprising of eyelashes or hair on the body.

The compositions and methods of the present invention can comprise, consist of, or consist essentially of the essential elements and limitations of the invention described herein, as well as any additional or optional ingredients, components, or limitations described herein or otherwise useful.

Unless otherwise specified herein, all percentages and ratios of components are by weight relative to the total weight of the final composition.

It has been surprisingly and unexpectedly discovered by the inventors that compositions comprising a combination at least one antioxidant compound and a color altering system, such as an oxidizing lifting or bleaching or coloring composition, when applied to keratinous materials such as hair, with and without heat, confer protection to the keratinous material from the damaging effects of oxidizing agents in the color altering system; enhance and protect one or more sensorial features and preserve the mechanical properties and native amino acid structure of the keratinous material treated with oxidizing agents in the color altering system. Thus, the inventive treatment compositions confer protection to the keratinous material from the damaging effects of oxidizing agents to enhance and protect one or more sensorial features selected from combability, softness, elasticity, moisture and shine. In some particular examples, the inventors have discovered that using an antioxidant composition on hair prior to or at the time of application of at least a bleach (oxidative precursor), particularly an antioxidant selected from baicalin, ferulic acid, pine bark extract, polydatin and ellagic acid, resulted in significant retention of mechanical and sensorial properties of the hair as compared with treatments with color altering systems in the absence of an antioxidant.

Without being bound to any one theory, the inventors of the present disclosure believe that the antioxidant compounds in the treatment compositions of the invention serve to capture oxidative species (free radicals) generated in the oxidation reaction to prevent their association with the keratin fibers, thereby protecting the keratinous material from damage or minimizing damage to hair. Thus, while other compositions that employ acid may effectively reduce pH and slow down the rate of oxidation, they lack the benefit of protecting the keratin fibers from damage or minimizing damage caused by excess radicals. The inventive compositions provide a surprising and unexpected protective benefit that is not observed with comparative formulations that comprise acids.

The compositions, according to the invention, are compositions including at least one or more antioxidant compounds, and components of color altering system, including optionally one or more dyes or colorants. The composition may include other suitable ingredients for hair treatment or hair repair. For example, known solvents and/or additives may be utilized in addition to the antioxidant compound to provide additional benefits to the composition.

Antioxidant Compositions

The antioxidant composition according to the disclosure are variously included in the inventive compositions. The antioxidant compositions comprise at least one antioxidant compound. Some representative examples of antioxidant compounds include baicalin (*Scutellaria Baicalensis* root extract), pine bark extract (*Pinus Pinaster* bark/bud extract), ferulic acid (a hydroxycinnamic acid) and ellagic acid. Other examples include dihydrochalone, ascorbic acid, zinc PCA, and polydatin. More generally, the antioxidant compounds may be selected from among other phenolic compounds (including polyphenols).

Phenolic Compounds

Phenolic compounds are a structural class of natural, synthetic, and semisynthetic organic compounds that have one or more phenolic constituents. Phenolic compounds containing multiple phenol groups are known as polyphenols. Polyphenols are normally available in plants and are very helpful to protect plants and also animals from usual health disorders and also the impacts of aging. Polyphenols function as potent free radical scavengers by donating their alcoholic hydrogen or one of their delocalized electrons. The two classes of polyphenols are flavonoids and non-flavonoids.

Flavonoids are a specific group of polyphenols, and are the most plentiful group of polyphenol compounds, making up about two-thirds of the total phenols in consumed feed. Flavonoids are further categorized, according to chemical structure, into chalcones, flavones, flavanones, flavanols, flavonols, dihydroflavonols, isoflavonoids, neoflavonoids, catechins, anthocyanidins, and tannins. Over 4,000 flavonoids have been identified, many of which occur in fruits, vegetables and beverages (tea, coffee, beer, wine and fruit drinks). The flavonoids have been reported to have antiviral, anti-allergic, antiplatelet, anti-inflammatory, antitumor and antioxidant activities. Flavonoids protect lipids and vital cell components from damaging oxidative stress by efficiently scavenging free radicals.

Non-flavonoid polyphenols include lignans, aurones, stilbenoids, curcuminoids and other phenylpropanoids. Many of them are also well-known antioxidants like resveratrol, curcumin, and pinoresinol.

Other phenolic compounds, in addition to polyphenols, include alkylphenols, betacyanins, capsacinoids, hydroxybenzoketones, methoxyphenols, naphthoquinones, and phenolic terpenes. Some popular examples are ferulic acid, hydroxytyrosol, cinnamic acid, caffeic acid, and p-coumaric acid.

Selected Antioxidant Compounds

In accordance with some particular examples according to the disclosure, antioxidant compounds include one or more of baicalin (*Scutellaria Baicalensis* root extract), pine bark extract (*Pinus Pinaster* bark/bud extract), ferulic acid (a hydroxycinnamic acid) and ellagic acid.

*Scutellaria Baicalensis* root extract includes the compound baicalin, which has also been identified as a component of Chinese medicinal herb Huang-chin, is a flavone, a type of flavonoid. It is a potent antioxidant that demonstrates potent effects against oxidative stress diseases, inflammation, allergy, cancer, bacterial infections, etc.

Pine bark extract (*Pinus Pinaster* bark/bud extract) contains a variety of compounds, including oligomeric proanthocyanidin compounds, and is generally associated with benefits that range from cholesterol control to cardiovascular, other circulatory and brain benefits.

Ferulic acid is a hydroxycinnamic acid that can be broadly found in giant fennel, the seeds of coffee, apple, artichoke, peanut, and oranges, as well as in both seeds and cell walls of commelinid plants (such as rice, wheat, oats, and pineapple). Like many natural phenols, it is a strong antioxidant that is very reactive toward free radicals and reduces oxidative stress. Many studies suggest that ferulic acid may have antitumor activity.

Ellagic acid is a small phytochemical that occurs naturally in red fruits and berries and in some nuts, including pomegranate, strawberries, blackberries, raspberries, cranberries, walnuts and pecans. Ellagic acid can also be generated by breaking down ellagitannins that can be obtained from some plants. Ellagic acid has been shown to have anticancer activity among other benefits.

In accordance with the disclosure, the antioxidant compositions comprise an antioxidant up to 100%, and may comprise a diluent or carrier or other component, such as for example, sodium silicate. In some embodiments, the antioxidant compositions include an antioxidant active that is present at a concentration, by weight, of about 50%. Thus, in accordance with the inventive compositions, a composition comprising (a) an antioxidant composition comprising at least one antioxidant compound, and a color altering system that includes (b) a bleach, and (c) a developer, or (c) a developer and (d) a colorant which can be selected from oxidative dye precursors, wherein, according to methods of use of the composition, (i) (a) and one or more of (b) and (c), or (ii) (a) and one or more of (c) and (d) are combined or combinable, the antioxidant composition may comprise an antioxidant active that is present up to 100%, or may be present in an amount that is less than 100%, such as for example, 50%.

Thus, antioxidants are used in the compositions as raw materials that include from about 0.1% or less, to about 100% of at least one antioxidant active, and are in some examples provided in a mixture together with a component, such as, but not limited to, sodium silicate, where the at least one antioxidant active is present in the mixture from about 0.1% to about 99%, by weight, based on the total weight of the raw material.

In accordance with the various embodiments as set forth herein below, the compositions, kits and methods of the invention include with the at least one antioxidant, one or more components of a color altering system selected from the group consisting of: a bleach, a developer and a colorant selected from oxidative dye precursors and direct dyes. Embodiments that are useful for color lightening or lifting comprise a bleach as an oxidizer and a developer as an oxidizing agent. Embodiments that are useful for color changing or depositing comprise a colorant and a developer. Thus, in the various embodiments, compositions and mixtures include at least one antioxidant, one or the other of a bleach and a colorant, and a developer.

In a representative example, as further described in the examples herein below, a composition comprising (a) an antioxidant composition comprising at least one antioxidant compound, and a color altering system that includes (b) one of a bleach and a colorant, and (c) a developer, wherein, according to methods of use of the composition, (a) and one or more of (b) and (c), are combined or combinable includes 15 g of bleach and 0.2 g of a composition that comprises 50% baicalin active. Thus, the amount of baicalin active present is 0.1 g. Expressed as a weight percent of the combination of bleach and baicalin, the baicalin is present in the compositions at about 0.7% by weight, based on the weight of the composition comprising the baicalin antioxidant and the bleach. For purposes of this example, the amount of developer is not considered in the calculation of the total weight of the composition. Reference is made to the examples herein below with respect to the absolute weight amounts of each of the other exemplified antioxidant compositions, wherein for each of them, the weight percent thereof may be expressed as the percentage by weight of the combination of the antioxidant and the bleach.

Thus, in accordance with the disclosure, the amount of baicalin active that is present in the inventive a composition comprising (a) an antioxidant composition comprising at least one antioxidant compound, and a color altering system that includes (b) one of a bleach and a colorant, and (c) a developer, wherein, according to methods of use of the composition, (a) and one or more of (b) and (c) are combined or combinable can range from at least about 0.1%, and up to about 5%, based on the weight of the total composition comprising the antioxidant and the bleach. In some particular embodiments, the amount of baicalin can range from about 0.2% to about 4%; or from about 0.3% to about 3.5%; or from about 0.7% to about 2.3%, based on the total weight of the composition comprising the antioxidant and the bleach. In accordance with some embodiments, the compositions include not more than 2.5% baicalin. In accordance with other embodiments, the compositions include not more than 2.3%, or not more than 2% or not more than 1.5%, or not more than 1%, or not more than 0.7%, or not more than 0.5% baicalin.

Thus, in accordance with the disclosure, the amount of pine bark extract active that is present in the inventive a composition comprising (a) an antioxidant composition comprising at least one antioxidant compound, and a color altering system that includes (b) one of a bleach and a colorant, and (c) a developer, wherein, according to methods of use of the composition, (a) and one or more of (b) and (c) are combined or combinable can range from at least about 0.1%, and up to about 5%, based on the weight of the total composition comprising the antioxidant and the bleach. In some particular embodiments, the amount of pine bark extract can range from about 0.2% to about 4%; or from about 0.3% to about 3.5%; or from about 0.7% to about 2.3%, based on the total weight of the composition comprising the antioxidant and the bleach. In accordance with some embodiments, the compositions include not more than 2.5% pine bark extract. In accordance with other embodiments, the compositions include not more than 2.3%, or not more than 2% or not more than 1.5%, or not more than 1%, or not more than 0.7%, or not more than 0.5% pine bark extract.

Thus, in accordance with the disclosure, the amount of ferulic acid active that is present in the inventive a composition comprising (a) an antioxidant composition comprising at least one antioxidant compound, and a color altering system that includes (b) one of a bleach and a colorant, and (c) a developer, wherein, according to methods of use of the composition, (a) and one or more of (b) and (c), are combined or combinable can range from at least about 0.1%, and up to about 3%, based on the weight of the total composition comprising the antioxidant and the bleach. In some particular embodiments, the amount of ferulic acid can range from about 0.2% to about 2%; or from about 0.3% to about 1.5%; or from about 0.7% to about 1.2%, based on the total weight of the composition comprising the antioxidant and the bleach. In accordance with some embodiments, the compositions include not more than 2% ferulic acid. In accordance with other embodiments, the compositions include not more than 1.8%, or not more than 1.6% or not more than 1.4%, or not more than 1.2%, or not more than 0.8%, or not more than 0.5% ferulic acid.

Thus, in accordance with the disclosure, the amount of ellagic acid active that is present in the inventive a composition comprising (a) an antioxidant composition comprising at least one antioxidant compound, and a color altering system that includes (b) one of a bleach and a colorant, and (c) a developer, wherein, according to methods of use of the composition, (a) and one or more of (b) and (c), are combined or combinable can range from at least about 0.1%, and up to about 3%, based on the weight of the total composition comprising the antioxidant and the bleach. In some particular embodiments, the amount of ellagic acid can range from about 0.2% to about 2.5%; or from about 0.6% to about 2.0%; or from about 0.9% to about 1.8%, based on the total weight of the composition comprising the antioxidant and the bleach. In accordance with some embodiments, the compositions include not more than 2.5% ellagic acid. In accordance with other embodiments, the compositions include not more than 2.3%, or not more than 2% or not more than 1.5%, or not more than 1.2%, or not more than 0.9%, or not more than 0.5% ellagic acid.

As described herein, an antioxidant may be provided in a raw material form that may include one or more additional components, wherein the amount of an antioxidant active in such raw material composition may range from 0.1% to 99% active. Thus, in various embodiments, any one or more of antioxidant components may be present in any composition according to the disclosure in a weight percent amount as described herein above, that is determined as the product of the percentage purity (based upon weight, unless otherwise stated) of the antioxidant in the raw material composition and the percentage, by weight, of the raw material composition used in the inventive composition. Thus, one or more antioxidant actives may be present in an antioxidant raw material composition in an amount that ranges from 0.01 to about 99%, or from about 0.01, 0.05, 0.1, 0.2, 0.3, 04, 0.5, 0.6, 0.7, 0.8, 0.9, 1, 2, 3, 4, 5, 6, 7, 8, 9, 10, 15, 20, 25, 30, 35, 40, 45, 50, 55, 60, 65, 70, 75, 80, 85, 90, 95 to about 99 percent by weight, including increments and ranges therein and there between. And an inventive composition comprising at least one antioxidant active, and one or more of a bleach, a developer, a colorant, a carrier, and an additive or auxiliary, will comprise antioxidant active from about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 3, 4, to about 5 percent by weight, including increments and ranges therein and there between. In one example, an inventive composition includes 0.4% by weight of an antioxidant raw material composition that comprises 50% antioxidant active; thus, the inventive composition comprises 0.2% antioxidant active.

Additives

Optional Additional Antioxidants

The compositions can also contain one or more additional antioxidants that is/are different from the flavonoid(s) used in the composition and ferulic acid. Additional antioxidants can be any antioxidant suitable for use in cosmetic formulations. Suitable antioxidants include, but are not limited to, resveratrol, tannic acid, polyphenols, amino acids and derivatives thereof, imidazoles, peptides such as carnosine and derivatives, carotenoids, carotenes (such as α-carotene, β-carotene, and lycopene), α-hydroxy acids (such as citric acid, lactic acid, or malic acid), tocopherols and derivatives (such as Vitamin E), vitamin A, ascorbic acid, co-enzyme Q10, bioflavonoids, glutathione, plant extracts (such as rosemary extract, olive leaf extracts), and green tea extracts.

The amount of additional antioxidants present in the compositions can range from about 0.01% to about 20%; about 0.1% to about 20%; or about 0.01% to about 10%, based on the total weight of the composition.

Optional Hydrotropes

Hydrotropes or glycols may be used in some embodiments to increase solubility of the components of the compositions if solubility of any of the components in water is low. A hydrotrope solution is prepared by completely dissolving one or more hydrotropic agents into water. The component(s) are then added in and mixed using stirring bar or any other mixer. Solubilization of the components occurs within minutes, and mixing continued until clear stable solution is obtained, usually within one hour of mixing. No heat is necessary by following this procedure to dissolve phenolic compounds. Everything is prepared at room temperature to keep the stability of phenolic compounds. This is extremely useful to protect the activity of certain compounds and also makes the process much easier.

Hydrotropes (or hydrotropic agents) are a diverse class of water-soluble compounds that are characterized by an amphiphilic molecular structure and ability to dramatically increase the solubility of poorly soluble organic molecules in water. The at least one hydrotrope is present in the composition in amounts effective to increase the solubility of the phenolic compound in water. At least one hydrotrope refers to one or a combination of two or more hydrotropes. One or a combination of two or more hydrotropes can be used to improve the solubility of phenolic compounds in water. The amount of hydrotrope will vary depending on the hydrotrope and the type and amount of phenolic compound. Increasing the water solubility of the phenolic compound(s) refers to increasing the solubility of the phenolic compound(s) in water in comparison with solubility of the phenolic compound(s) in water in the absence of the hydrotrope or hydrotropes.

An advantage of using hydrotropes is, once a stable solution is obtained, further dilution doesn't influence the stability of the solution. This is very different from organic solvents that are commonly used to increase the water solubility of phenolic compounds, such as polyphenols. Typically, an aqueous dilution of organic solvents with pre-dissolved phenolic compound(s), such as a polyphenol, results in crystallization or precipitation.

Most hydrotropes have aromatic structure with an ionic moiety, while some of them are linear alkyl chains, as listed in the table below. Although hydrotropes noticeably resemble surfactants and have the ability to reduce surface tension, their small hydrophobic units and relatively shorter alkyl chain distinguish them as a separate class of amphiphiles. Consequently, their hydrophobicity is not sufficient enough to create well organized self-associated structures, such as micelles, even with a high concentration.

Common hydrotropic molecules include: sodium 1,3-benzenedisulfonate, sodium benzoate, sodium 4-pyridinecarboxylate, sodium salicylate, sodium benzene sulfonate, caffeine, sodium p-toluene sulfonate, sodium butyl monoglycolsulfate, 4-aminobenzoic acid HCl, sodium cumene sulfonate, N,N-diethylnicotinamide, N-picolylnicotinamide, N-allylnicotinamide, 2-methacryloyloxyethyl phosphorylcholine, resorcinol, butylurea, pyrogallol, N-picolylacetamide 3.5, procaine HCl, proline HCl, nicotinamide, pyridine, 3-picolylamine, sodium ibuprofen, sodium xylenesulfonate, ethyl carbamate, pyridoxal hydrochloride, sodium benzoate, 2-pyrrolidone, ethylurea, N,N-dimethylacetamide, N-methylacetamide, and isoniazid. Hydrotropes can be found in Lee J. et al., "Hydrotropic Solubilization of Paclitaxel: Analysis of Chemical Structures for Hydrotropic Property", Pharmaceutical Research, Vol. 20, No. 7, 2003; and Lee S. et al., "Hydrotropic Polymers: Synthesis and Characterization of Polymers Containing Picolylnicotinamide Moieties", Macromolecules, 36, 2248-2255, 2003.

Cosmetically acceptable hydrotropes refers to hydrotropes that can be used in cosmetic compositions. While hydrotropes represent a broad class of molecules used in various fields, cosmetic applications will be limited due to safety and tolerance restrictions. Suitable hydrotropes for use in cosmetics include, but are not limited to, nicotinamide (vitamin B3), caffeine, sodium PCA (sodium salt of pyrrolidone carbonic acid), sodium salicylate, urea, and hydroxyethyl urea. The suitability of a hydrotrope for use in cosmetic compositions can be determined using tests known in the art for determining effects on skin, and toxicity to humans.

The amount of hydrotropes present in the compositions can range from about 0.1% to about 20%; about 0.1% to about 10%; or about 1% to about 50%, based on the total weight of the composition.

Water

The antioxidant containing compositions can contain from about 1 to about 99.9% by weight of water, with respect to the total weight of the composition. The amount of water in the composition can range from about 1 to 99.5%; about 1 to 60%; or about 1 to 50%, based on the total weight of the composition.

pH

The pH of the compositions is not limited but is generally between 2 and 12, or between 3 and 9. The pH can be adjusted to the desired value by addition of a base (organic or inorganic) to the composition, for example ammonia or a primary, secondary or tertiary (poly)amine, such as monoethanolamine, diethanolamine, triethanolamine, isopropanolamine or 1,3-propanediamine, or alternatively by addition of an inorganic or organic acid, advantageously a carboxylic acid, such as, for example, citric acid.

Color Altering Systems

Color altering systems as defined herein refer to systems, compositions and components that can change the color of hair, remover the color of hair or lighten or lift the color of hair. Such components can be in the form of a bleach or a developer or a colorant or a combination of a bleach and a developer or a combination of a colorant and a developer.

Bleach Composition

In accordance with the various embodiments, the color altering system includes a bleach composition that comprises at least one oxidant chosen from persulfates, perborates, percarbonates, peracids, bromates, their salts, and mixtures thereof. In various embodiments, the at least one oxidant is chosen from alkali metal salts of perborates, percarbonates, bromates, and persulfates, such as, for example, ammonium, sodium, and potassium salts. The bleach composition may also optionally comprise a cosmetically acceptable carrier.

The at least one oxidant of the bleach composition according to various embodiments of the disclosure is utilized in an amount sufficient to lighten or "bleach" hair. By way of example only, the at least one oxidizing agent of the bleach composition may be present in an amount ranging from about 10% by weight to about 100% by weight, such as from about 20% to about 90% by weight, from about 30% to about 80% by weight, or from about 40% to about 75% by weight, based on the total weight of the bleach composition. In further embodiments, the at least one oxidizing agent of the bleach composition may be present in an amount ranging from about 5% to about 50%, such as about 10% to about 45%, or about 15% to about 40%). In one exemplary embodiment, the at least one oxidizing agent of the bleach composition may be present in an amount of at least 40% by weight, based on the total weight of the bleach composition.

In a representative example, a bleach used in the color altering systems according to the disclosure may be a commercial Bleach Powder.

The bleach composition may be in any form, such as, for example, in the form of a powder, gel, liquid, foam, lotion, cream, mousse, and emulsion. In various exemplary embodiments, the bleach composition may be anhydrous (i.e., does not contain more than 1% by weight or does not contain more than 0.5% by weight of added water). Optionally, water may be added as an activator, by mixing it with the bleach composition. The bleach composition may, in various embodiments, comprise additional components such as, for example, at least one auxiliary ingredient chosen from rheology-modifying agents, chelants, fatty substances, ceramides, alkoxyaminosilicones, and silanes, and any other component known in the art to be useful in a bleach composition.

The bleach composition of the present invention may also contain acid and alkali pH adjusters, which are well known in the art in the cosmetic treatment of keratin fibers, such as hair. Such pH adjusters include, but are not limited to, sodium metasilicate, silicate compounds, citric acid, ascorbic acid, and carbonate compounds. The pH adjusters may, in various embodiments, be present in the bleach composition in an amount effective to provide the color-altering composition with a pH ranging from about 1 to about 7 when the bleach composition is combined with the developer.

The bleach composition may optionally contain dessicants, such as silica. The silica may be present in an amount of from about 1% to about 3% by weight of the dessicant, based on the total weight of the bleach composition. As a further example, de-dusting agents may also be incorporated in the bleach compositions, e.g. when the bleach composition is in powder form and/or in cream form. Exemplary de-dusting agents include anhydrous and/or inert liquids, such as oils, esters, alkanes, alkenes, and mixtures thereof. The de-dusting agent may comprise less than about 35% by weight, based on the total weight of the bleach composition, such as from about 1% to about 25% by weight, based on the total weight of the bleach composition.

Developer Composition

The developer composition comprises at least one oxidizing agent, in one example, hydrogen peroxide. The at least one oxidizing agent may also be chosen from air and enzymes. The developer composition may also optionally comprise a cosmetically acceptable carrier.

In various exemplary embodiments, the at least one oxidizing agent (e.g., hydrogen peroxide) is present in an amount of at least about 1% by weight, based on the total weight of the developer composition. In further embodiments, hydrogen peroxide is present in an amount ranging from about 0.1% to about 80% by weight, such as from about 1.0% to about 75% by weight, or from about 2% to about 10% by weight, based on the total weight of the developer composition. In further exemplary embodiments, the hydrogen peroxide may be present in the developer composition in an amount ranging from about 2% to about 25%, such as about 4% to about 20%, about 6% to about 15%, or about 7% to about 10%.

The cosmetically acceptable carrier of the developer composition may, for example, be present in an amount ranging from about 0.5% to about 99% by weight, such as from about 5% to about 95% by weight, relative to the total weight of the developer composition.

The pH of the developer composition can range from about 1 to about 5, such as from about 2 to about 4, and it may be adjusted to the desired value using pH adjusters that are well known in the art in the cosmetic treatment of keratin fibers, including, for example, those described herein.

The developer composition may be in the form of a powder, gel, liquid, foam, lotion, cream, mousse, and emulsion. According to various exemplary embodiments, the developer composition may be anhydrous. Optionally, water may be added as an activator, by mixing it with the developer composition. The developer composition may, in various embodiments, comprise additional components such as, for example, at least one auxiliary ingredient chosen from rheology-modifying agents, chelants, fatty substances, ceramides, alkoxyaminosilicones, and silanes, and any other component known in the art to be useful in a developer composition.

In at least one exemplary embodiment, the bleach composition may be mixed with the developer composition, either before, after or contemporaneous with the application of the antioxidant composition to the hair, or mixing the antioxidant composition with one or more component of the hair color altering system, to form a hair treatment composition before (e.g. within a few minutes before) applying the hair treatment composition onto the hair.

In one exemplary embodiment, the bleach composition and developer composition may be combined, either before, after or contemporaneous with the application of the antioxidant composition to the hair, or mixing the antioxidant composition with one or more component of the hair color altering system, to form a hair treatment composition in the form of a lightening composition in a ratio of bleach composition to developer composition ranging from about 1:1 to about 1:5, such as from about 1:2 to about 1:4.

Colorants or Dyes

It is known practice to alter the color of hair with lifts and/or dye compositions comprising oxidation dye precursors, which are also generally known as oxidation bases. Dye compositions comprising oxidation dye precursors are typically combined with an oxidizing agent (which may also be called a developer). Oxidation bases are colorless or weakly colored compounds, which, when combined with developers, give rise to colored compounds via a process of oxidative condensation. It is also known that the shades obtained with these oxidation bases can be varied by combining them with couplers or coloration modifiers. The variety of molecules used as oxidation bases and couplers allows a wide range of colors to be obtained.

In accordance with the various embodiments, the compositions hereof include, together in various forms with at least one antioxidant composition, one or more hair color-altering compositions or systems selected from a permanent hair dye product, a semi-permanent hair dye product, a demi-permanent hair dye product, a bleach product, a temporary dye product, or a hair lightening or highlighting product. In various embodiments, the hair color-altering composition includes a color altering system that is comprised of each of at least one bleach and at least one developer. In various other embodiments, the hair color-altering composition includes a color altering system that is comprised of each of at least one dye or hair colorant and at least one developer. Optionally, the hair color-altering composition comprising at least one dye or hair colorant comprises one or more of any of a variety of oxidative dye precursors, dye couplers, modifiers and additives.

According to some embodiments, when lifting of the color of hair is desired, the antioxidant compositions of the present invention are capable of being mixed with a color altering system containing at least oxidizing agent or at least one oxidant.

According to some embodiments, artificial color may be derived from oxidative coloration using oxidative dye precursors, or from direct coloration using direct dyes, or from oxidative coloration using a combination of oxidative dye precursors and direct dyes, or from temporary coloration using temporary colorants such as pigments and natural dyes.

According to some embodiments, when oxidative coloration on hair is to be performed, the antioxidant compositions of the present invention are combined with a color altering system comprising a colorant chosen from oxidative dye precursors and capable of being mixed with a developer containing an oxidizing agent.

Colorants may also optionally be present in the bleach composition wherein such colorants useful according to various embodiments of the disclosure are those colorants that are stable in the bleach composition, and can impart additional toning and coloring to hair. Exemplary hair colorants include, but are not limited to, pigments, liposoluble dyes, direct dyes, nacreous pigments, pearling agents, leuco dyes, optical lightening colorants, natural colorants and optically-variable pigments. In at least one embodiment, the colorants present in the compositions according to the disclosure are non-oxidative colorants or dyes.

In some embodiments, the color-altering system also comprises a colorant chosen from at least one direct dye, as described above.

In addition, the color-altering system may further comprise a cosmetically acceptable carrier and/or additional auxiliary ingredients, such as described above.

Typically, a dye composition containing oxidative dye precursors can be mixed with a developer in a ratio by weight of from about 1:0.01 to about 1:10, such as from about 1:0.01 to about 1:0.05, from about 1:0.05 to about 1:0.1, from about 1:0.1 to about 1:0.5, from about 1:0.5 to about 1:1, from about 1:1 to about 1:2, from about 1:2 to about 1:3, from about 1:3 to about 1:4, from about 1:4 to about 1:5, from about 1:5 to about 1:10. Thus, in accordance with the various embodiments, a dye composition containing oxidative dye precursor can be mixed or combined with an developer in a ratio, by weight, from 1 to one of about 0.01, 0.02, 0.03, 0.04, 0.05, 0.06, 0.07, 0.08, 0.09, 0.1, 0.2, 03, 0.4, 0.5, 0.6, 0.7, 0.8, 0.9, 1, 2, 3, 4, 5, 6, 7, 8, 9, and 10, including increments and ranges therein and there between from about 1:0.01 to about 1:10.

Cosmetically Acceptable Carrier

The antioxidant composition and the color altering systems of the present invention may optionally contain a cosmetically acceptable carrier. The cosmetically acceptable carrier can be present in the compositions of the present invention in the amount of about 95%, 90%, 80%, 70%, 60%, 50%, 40%, 30%, 20%, 10%, 5% by weight or less, relative to the total weight of the compositions. Additionally, the cosmetically acceptable carrier can be present in the compositions of the present invention in the amount of from about 1% to about 95% by weight, or from about 5% to about 90% by weight, or from about 20% to about 90% by weight, or from about 50% to about 90% by weight, relative to the weight of the compositions.

Useful cosmetically acceptable carriers include, but are not limited to, one or more aqueous systems, glycerin, C1-4 alcohols, organic solvents, fatty alcohols, fatty ethers, fatty esters, polyols, glycols, vegetable oils, mineral oils, liposomes, laminar lipid materials, silicone oils, water, or any combinations thereof. As examples of organic solvents, non-limiting mentions can be made of monoalcohols and polyols such as ethyl alcohol, isopropyl alcohol, propyl alcohol, benzyl alcohol, and phenylethyl alcohol, or glycols or glycol ethers such as, for example, monomethyl, monoethyl and monobutyl ethers of ethylene glycol, propylene glycol or ethers thereof such as, for example, monomethyl ether of propylene glycol, butylene glycol, hexylene glycol, dipropylene glycol as well as alkyl ethers of diethylene glycol, for example monoethyl ether or monobutyl ether of diethylene glycol. Other suitable examples of organic solvents are ethylene glycol, propylene glycol, butylene glycol, hexylene glycol, propane diol, and glycerin. The organic solvents for use in the present invention can be volatile or non-volatile compounds. The color altering systems of the present invention can comprise other compounds constituting the cosmetically acceptable carrier. This cosmetically acceptable carrier may comprise water, a mixture of water and at least one cosmetically acceptable organic solvent, or at least one cosmetically acceptable organic solvent.

In certain embodiments of the present invention, the at least one cosmetically acceptable carrier is chosen from ethanol, glycol ether, for example, dipropylene glycol n-butyl ether, known under the tradename of DOWANOL DPnB, isododecane, mineral oil, propylene glycol, pentylene glycol, hexylene glycol, glycerol, ethanol, water, ethylene glycol, propylene glycol, butylene glycol, hexylene glycol, propane diol, glycerin, and mixtures thereof. In addition, the vehicle of the color altering systems according to the present invention can be in the form of a homogeneous phase formulation or in the form of an emulsion including, but not limited to, oil-in-water, water-in-oil and multiple including triple, phase emulsions. These emulsions can cover a broad range of consistencies including thin lotions (which can also be suitable for spray or aerosol delivery), creamy lotions, light creams and heavy creams. Other suitable topical carriers include anhydrous liquid solvents such as oil and alcohol; aqueous-based single phase liquid solvent (e.g., hydro-alcoholic solvent system); anhydrous solid and semisolid (such as gel and stick); and aqueous based gel and mousse system.

Auxiliary Ingredients

The antioxidant compound containing compositions and color altering systems of the present invention can also comprise auxiliary ingredients, for instance those chosen from the non-exhaustive list such as propellants, emulsifiers, rheology modifiers and film forming agents such as film forming polymers, non-film forming polymers, humectants, conditioning agents, plasticizers, coalescers, fillers, dyes such as oxidative dyes and direct dyes, waxes, surfactants, preserving agents, oils such as mineral, organic or plant oils, fragrances, antioxidants, sunscreens, sequestering agents, softeners, antifoams, basifying agents, wetting agents, spreading agents, dispersants, pigments, proteins, ceramides, vitamins, clays, colloidal minerals, nacreous agents, peptizers, preserving agents, reducing agents, oxidizing agents, pH adjusters, silicones, plant extracts, paraffins, fatty acids, and mixtures thereof.

The person skilled in the art will ensure that any auxiliary ingredient and their amounts are selected in such a way as to cause no detriment to the properties of the compositions disclosed herein.

The at least one auxiliary ingredient may be present in an amount ranging from 0.001% to 50% by weight, relative to the total weight of the entire composition, including all ranges and subranges there between.

If present in a composition, the above-described auxiliary ingredients are generally present in an amount ranging up to about 50% by weight including all ranges and subranges therebetween, based on the total weight of the composition, such as up to about 50%, up to about 40%, up to about 30%, up to about 20%, up to about 15%, up to about 10%, up to about 5%, such as from about 0.001% to about 50%, or from about 0.001% to about 40%, or from about 0.001% to about 30%, or from about 0.001% to about 20%, or from about 0.001% to about 10%, by weight, based on the total weight of the composition.

Needless to say, a person skilled in the art will take care to select this or these optional additional compound(s), and/or the amount thereof, such that the advantageous properties of the composition, according to the invention, are not, or are not substantially, adversely affected by the envisaged addition.

Other Additives

Film Formers and Emulsifiers

In some embodiments, the compositions of the present invention may contain at least one film forming polymer chosen from all the anionic, cationic, amphoteric and non-ionic film forming polymers and mixtures thereof.

In some embodiments, the compositions of the present invention may contain at least one emulsifier. Emulsifiers or dispersing agents, include, without limitation, any which are compatible with the solvent and ingredients used in the composition of the present invention. The emulsifying agents which can be used according to the invention are those having an HLB of less than 7 and in particular fatty acid esters of polyols such as mono-, di-, tri- or sesquioleates or -stearates of sorbitol or glycerol, laurates of glycerol or polethylene glycol; alkyl or alkoxy dimethicone copolyols having an alkyl or alkoxy chain pendent or at the end of a silicone-based backbone having for example from 6 to 22 carbon atoms. The emulsifying agents may also be those having an HLB greater than 7 such as fatty acid esters of polyethylene glycol (monostearate or monolaurate of polyethylene glycol); esters of fatty acids (stearate, oleate) of sorbitol which are polyoxyethylenated; polyoxy ethylenated alkyl (lauryl, cetyl, stearyl, octyl)ethers and dimethicone copolyols. In general, it is possible to use nonionic or anionic or cationic emulsifiers well known to persons skilled in the art.

The nonionic type emulsifiers are fatty acids or amides of polyalkoxylated and/or polyglycerolated fatty acids; polyoxyethylenated and/or polyoxypropylenated fatty alcohols (i.e., compounds prepared by reacting an aliphatic fatty alcohol such as behenyl or cetyl alcohol with ethylene oxide or propylene oxide or an ethylene oxide/propylene oxide mixture); fatty acid esters of polyols, optionally polyoxyethylenated and/or polyoxypropylenated (i.e., compounds prepared by reacting a fatty acid such as stearic acid or oleic acid with a polyol such as, for example, an alkylene glycol or glycerol or a polyglycerol, optionally in the presence of ethylene oxide or propylene oxide or an ethylene oxide/propylene oxide mixture); and polyalkoxylated and/or polyglycerolated alkylphenols; or polyalkoxylated and/or polyglycerolated 1,2- or 1,3-alkanediols; and alkylethers of polyalkoxylated and/or polyglycerolated 1,2- or 1,3-alkanediols or alkenediols, or mixtures thereof. The esters of fatty acids and polyoxyethylenated polyols for which the polyol is sorbitol are known products (Polysorbate and products sold under the mark "Tween").

The emulsifiers can also be anionic surfactants which may have a hydrophilic-lipophilic balance (HLB) ranging from 10 to 40. They are principally salts of fatty acids (for example alkaline salts or organic salts such as amine salts), the said fatty acids having, for example, from 12 to 18 carbon atoms and being able to have a double bond in the case of oleic acid; the alkaline salts or salts of organic bases of alkyl-sulfuric and alkyl-sulfonic acids having 12 to 18 carbon atoms, of alkyl-arylsulfonic acids whose alkyl chain contains 6 to 16 carbon atoms, the aryl group being, for example, a phenyl group. They are also ether-sulfates, in particular, the sulfatation products of fatty alcohols and polyalkoxylated alkylphenols, in which the aliphatic chain has from 6 to 20 carbon atoms and the polyalkoxylated chain has from 1 to 30 oxyalkylene units, in particular oxyethylene, oxypropylene or oxybutylene. All these anionic surfactants are well known and many among them are commercial products. The emulsifiers can also be cationic surfactants such as quaternary ammonium derivatives. Some examples of emulsifying agents are Isoceteth-20, Polysorbate 20, PEG-40 hydrogenated castor oil, oleth-2, laureth-7, cetyl alcohol, glyceryl stearate, and mixtures thereof.

The emulsifiers may be employed in the compositions of the present invention in order to solubilize fatty substances such as fragrance oils or esters, whenever said fatty substances are additionally present in the compositions. When present, emulsifiers may be present in a composition of the present invention in an amount of from 0.05% to 10% by weight, preferably in an amount of from 0.1 percent to 5% by weight, and more preferably in an amount of from 0.5% to 3.0% by weight, based on the total weight of the composition.

Rheology Modifiers

In some embodiments, the compositions of the present invention may contain at least one rheology modifier (also called rheology-modifying agent). In some instances, certain rheology modifiers are also known as gelling agents or thickening agents. Broadly, the rheology modifier(s) that may be useful in the practice of the present invention include those conventionally used in cosmetics such as polymers of natural origin and synthetic polymers. Rheology modifiers are employed in the compositions of the present invention when it is desired to adjust the viscosity or thickness of the compositions or to achieve a particular composition texture. Representative rheology-modifying agents that may be used in the practice of the present invention are those other than the at least one film forming polymer of the present invention and include nonionic, anionic, cationic, and amphoteric polymers, and other rheology modifiers such as cellulose-based thickeners (e.g., hydroxyethylcellulose, hydroxypropylcellulose, carboxymethylcellulose, cationic cellulose ether derivatives, quaternized cellulose derivatives, etc.), guar gum and its derivatives (e.g., hydroxypropyl guar, cationic guar derivatives, etc.), gums such as gums of microbial origin (e.g., xanthan gum, scleroglucan gum, etc.), and gums derived from plant exudates (e.g., gum arabic, ghatti gum, karaya gum, gum tragacanth, carrageenan gum, agar gum and carob gum), pectins, alginates, and starches, crosslinked homopolymers of acrylic acid or of acrylamidopropane-sulfonic acid, associative polymers, non-associative thickening polymers, and water-soluble thickening polymers.

In some embodiments, the rheology-modifying agent includes a polymer other than the at least one film forming polymer of the present invention and chosen from nonionic, anionic, cationic and amphoteric amphiphilic polymers. The rheology-modifying agents may also be chosen from associative celluloses include quaternized cationic celluloses and quaternized cationic hydroxyethylcelluloses modified by groups containing at least one hydrophobic chain, such as alkyl, arylalkyl or alkylaryl groups containing at least 8 carbon atoms, and mixtures thereof. The alkyl radicals carried by the above quaternized celluloses or hydroxyethylcelluloses may, in various embodiments, comprise from 8 to 30 carbon atoms. The aryl radicals may, for example, denote the phenyl, benzyl, naphthyl or anthryl groups. Representative examples of quaternized alkylhydroxy-ethylcelluloses containing a C8-C30 hydrophobic chain include the products Quatrisoft LM 200®, Quatrisoft LM-X 529-18-A®, Quatrisoft LM-X 529-18B® (C12 alkyl) and Quatrisoft LM-X 529-8® (Ci8 alkyl) sold by Amerchol and the products Crodacel QM®, Crodacel QL® (C12 alkyl) and Crodacel QS® (Ci8 alkyl) sold by Croda.

Representative examples of nonionic cellulose derivatives include hydroxyethylcelluloses modified by groups comprising at least one hydrophobic chain, such as alkyl, arylalkyl or alkylaryl groups, or their blends, and in which the alkyl groups are, for example, C8-C22 alkyl groups, such as the product Natrosol Plus Grade 330 CS® (C16 alkyls) sold by Aqualon or the product Bermocoll EHM 100® sold by Berol Nobel. Representative examples of cellulose derivatives modified by alkylphenyl polyalkylene glycol ether groups include the product Amercell Polymer HM-1500® sold by Amerchol.

The rheology-modifying agent may be present in an amount ranging from about 0.01% to about 10% by weight, in some embodiments from about 0.1% to about 5% by weight, or from about 0.5% to about 1% by weight, based on the total weight of the composition.

Propellants

In some embodiments, the compositions of the present invention may contain at least one propellant. Propellants can used to deliver the composition as a foam (such as in a mousse or foam product). Representative examples of propellants include C3 to C5 alkanes such as n-butane, isobutane, isopropane, and propane, dimethyl ether, C2-halogenated hydrocarbons, e.g., 1,1-difluoroethane or hydroflurocarbon, difluoroethane, chlorodifluoroethane, chlorodifluoromethane, air (such as compressed air), nitrogen, carbon dioxide, and mixtures thereof. The amount of the propellant can range from about 3 to about 90%, and in some embodiments from about 3 to about 60%, by weight, or such as from about 3 to about 20% by weight, or such as from about 3 to about 10% by weight, or such as from about 3 to about 6%, by weight based on the total weight of the composition, including all ranges and subranges there between.

Formulating

The compositions in the methods of the present invention may be formulated in any suitable product form. Such product forms include, but are not limited to, aerosol spray, cream, dispersion, emulsion, foam, gel, liquid, lotion, mousse, ointment, patch, pomade, powder, pump spray, solid, solution, stick, tonic, and towelette. The compositions may also be provided as rinse-off or leave-in products, preferably, rinse-off products.

In one particular embodiment, a composition of the present invention is in the form of a liquid. In another particular embodiment, a composition of the present invention is in the form of a cream. In another particular embodiment, a composition of the present invention is in the form of a gel.

In some other embodiments, the cosmetically acceptable carrier in the composition of the present invention comprises at least one volatile organic solvent or compound (VOC) (e.g., in the case of a spray or an aerosol spray). To reduce the amount of VOC (low VOC product), the volatile organic solvent or compound is partially replaced with water. The amount of the volatile organic solvent generally ranges from greater than 0 (e.g., about 0.01%) to about 90%, and in some embodiments from greater than 0 to about 55%, and in some embodiments from greater than 0 to about 2%, by weight, based on the total weight of the composition. It is preferred that the amount of volatile organic solvent does not exceed 55% by weight.

The compositions of the present invention may be packaged, for example, in a bottle, a spray device such as an aerosol container/can, a pump dispenser or pump spray, a jar, such as those customary in cosmetology.

The compositions may be applied onto keratin fibers by using the fingers or hand, or by use of a suitable applicator or by directly dispensing the compositions from a device.

Process of Altering the Color of Hair

In some embodiments, the present invention involves altering the color of hair which may be achieved when the color of hair is lifted or lightened or removed and/or when artificial color is deposited onto hair. In an embodiment, a color altering system comprises a bleach and a developer.

In one embodiment, a color altering system comprises a dye or colorant and a developer (which results in artificial color on hair).

Artificial color may be derived from oxidative coloration using oxidative dye precursors, or from direct coloration using direct dyes, or from a combination of oxidative dye precursors and direct dyes, or from temporary coloration using temporary colorants such as pigments and natural dyes.

When lifting of the color or removal of color of hair is desired, the hair treatment compositions of the present invention include, in some embodiments, the antioxidant compositions mixed with a developer oxidizing agent and/or a bleach containing an oxidant.

When oxidative coloration on hair is to be performed, the hair treatment compositions of the present invention include, in some embodiments, the antioxidant composition mixed with any one of: a colorant chosen from oxidative dye precursors; and a developer containing an oxidizing agent.

The term "mixed" and all variations of this term as used herein refers to contacting or combining or reconstituting or dissolving or dispersing or blending or shaking the antioxidant composition with any one or more components of the color altering system. It can also mean introducing the antioxidant composition to the color altering system. It may also mean placing the antioxidant composition in the same vessel or container as any one or more components of the color altering system.

Thus, the process of altering the color of hair with a color altering system in accordance with the invention comprises applying a composition for altering the color of hair comprising the antioxidant composition and the color altering system of the present invention onto hair. Said composition that is applied onto hair is formed by mixing the antioxidant composition with the color altering system.

The antioxidant composition can be mixed or combined with the color altering system in a ratio by weight of from about 1:0.01 to about 1:10, such as from about 1:0.01 to about 1:0.05, from about 1:0.05 to about 1:0.1, from about 1:0.1 to about 1:0.5, from about 1:0.5 to about 1:1, from about 1:1 to about 1:2, from about 1:2 to about 1:3, from about 1:3 to about 1:4, from about 1:4 to about 1:5, from about 1:5 to about 1:10. Thus, in accordance with the various embodiments, an inventive composition according to the disclosure can be mixed or combined with an color altering system in a ratio, by weight, from 1 to one of about 0.01, 0.02, 0.03, 0.04, 0.05, 0.06, 0.07, 0.08, 0.09, 0.1, 0.2, 03, 0.4, 0.5, 0.6, 0.7, 0.8, 0.9, 1, 2, 3, 4, 5, 6, 7, 8, 9, and 10, including increments and ranges therein and there between from about 1:0.01 to about 1:10.

Upon application of the composition for altering the color of hair comprising the antioxidant composition and the color altering system and after a resting time (leave-on time) on the hair, for example, ranging from about 1 to about 60 minutes, such as from about 5 to about 45 minutes, or such as from about 5 to about 20 minutes, or such as from about 10 to about 20 minutes, or such as of about 20 minutes, the hair is rinsed, optionally washed with shampoo, rinsed again, optionally washed with a hair conditioning composition, and rinsed again, then dried. The shampoo and hair conditioning composition can be any conventional hair shampoo and conditioner products.

In some embodiments, the antioxidant composition is applied to the keratinous material either before, at the same time as, or after application of a color-altering composition. In some embodiments, application before or after is immediately before or after, and in other embodiments the timeframe between application of the inventive formulations and a color-altering composition may be minutes, hours or days.

In addition, the mixture or composition present on the fibers or hair (resulting from the extemporaneous mixing of the antioxidant composition and color altering systems, or from the successive application of the antioxidant composition and color altering systems, or from the application of the composition without any colorant or dye) is left in place for a time, generally, from about 1 to about 60 minutes, such as from about 5 to about 45 minutes, or such as from about 5 to about 30 minutes, or such as from about 5 to about 20 minutes, or such as from about 10 to about 20 minutes, or such as of about 20 minutes, or such as at about 10 minutes.

The temperature during the process of altering the color of hair is between room temperature and 80° C. and in some embodiments, between room temperature and 60° C.

An effective amount of the composition is typically from about 0.1 gram to about 50 grams, and in some applications for treatment of hair, in amounts from about 20 to 60 grams, and in yet further embodiments for an abundance of hair in amounts from about 20 to about 80 grams or more. It will thus be appreciated that the amounts applied depend on the amount or volume of keratinous material, such as hair, to be treated and may thus fall within lower ranges for small amounts or patches of hair to the higher ranges and beyond for large amounts or patches of hair. Typical applications are to the whole head in the case of treatment of hair. It will be understood that application to the hair typically includes working the composition through the hair.

The hair that has been contacted with the compositions of the present invention may be air-dried and/or further styled or shaped by applying heat on the hair and/or by combing or brushing or running the fingers through the hair. Other shaping tools may be chosen from combs and brushes.

A suitable applicator device is an applicator brush. It will be appreciated that while a brush is an example of a suitable applicator, particularly for hair, other applicators may be used, including but not limited to spray bottles, squeeze bottles, one and two chamber pumps, tubes, combs, and other applicators known in the art.

Instructions for applying a composition of the present invention onto keratin fibers such as hair may appear on the container (such as can, bottle or jar) holding a composition of the present invention or on the box or carton or other packaging comprising the container holding the composition.

The compositions described above are useful for application onto keratinous materials such as hair on the head of human individuals.

Thus, the compositions of the present invention can be made into various cosmetic products such hair care products, hair styling products and make up products.

The compositions of the present invention can be in the form of an aqueous composition or an emulsion, such as a lotion or cream.

As used herein, the process and composition disclosed herein may be used on the hair that has been or has not been one or more of artificially dyed, pigmented or permed.

As used herein, the process and composition disclosed herein may be used on hair that has been artificially dyed, pigmented or permed, relaxed, straightened or other chemical process.

The compositions according to the disclosure may be prepared according to techniques that are well known to those skilled in the art.

Although the foregoing refers to various exemplary embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art.

The following Examples are intended to be non-restrictive and explanatory only, with the scope of the invention being defined by the claims.

The ingredient amounts/concentrations in the treatment compositions/formulas described below, unless otherwise indicated, are expressed in % by weight, based on the total weight of the composition/formula comprising the antioxidant composition and the bleach component of the color altering system.

EXAMPLES

TABLE 1

Antioxidant Raw Materials

| Formula | Anti-Oxidant | Wt % AOx | Wt % Sodium Silicate |
|---|---|---|---|
| 1 (main) | Baicalin | 50 | 50 |
| 2 | Baicalin | 100 | 0 |
| 3 | Pine Extract | 100 | 0 |
| 4 | Dihydrochalone | 100 | 0 |
| 5 | Ascorbic Acid | 100 | 0 |
| 6 | Ferulic Acid | 100 | 0 |
| 7 | Zinc PCA | 100 | 0 |
| 8 | Polydatin | 100 | 0 |
| 9 | Ellagic Acid | 100 | 0 |

TABLE 2

Comparative Raw Materials

| Formula | Wt % Ethanolamine | Wt % Maleic Acid | Wt % Water |
|---|---|---|---|
| Comparative | 5.4 | 35.67 | 58.93 |

TABLE 3

Developer Formulations

| Component | 30V Developer | 40V Developer |
|---|---|---|
| Pentasodium Pentetate | 0.15 | 0.15 |
| Hydrogen Peroxide | 18 | 24 |
| Sodium Stannate | 0.04 | 0.04 |
| Phosphoric Acid | | |
| Tetrasodium Pyrophosphate | 0.02 | 0.02 |
| Water | 77.59 | 71.59 |
| Glycerine | 0.5 | 0.5 |
| Trideceth-2-Carboxamide Mea | 0.85 | 0.85 |
| Cetearyl Alcohol (and) Ceteareth | 2.85 | 2.85 |

TABLE 3B

Bleach powder

| Ingredient | wt. % |
|---|---|
| Magnesium Carbonate Hydroxide | 9 |
| Sodium Silicate | 17 |
| Disodium EDTA | 1 |
| Sodium Metasilicate | 3 |
| Surfactants | 11 |
| Potassium Persulfate | 50 |
| Ammonium Persulfate | 5 |
| Additives and Optional Ingredients | 4 |

The inventive and comparative raw material formulas (per Tables 1 and 2) are mixed with 15 g of commercial bleach powder and 15 g of a commercial bleach developer (either 30 or 40V) according to the weight amounts provided in Table 4. (In one example, an inventive formulation may be described on the basis of weight percent of the formulation as follows: 0.8 g Formula 1+15 g Bleach Powder=0.8 g/15.8 g, =~5 wt % Inventive Composition 1 (thus, 0.4 g baicalin in 0.8 g composition 1+15 g Bleach Powder=0.4 g/15.8 g=~2.5 wt % baicalin active).

The bleach mixture is applied to Regular Bleach Swatches, obtained from International Hair Import Products, for 35 minutes. The swatches are rinsed and shampooed once before being blown dry.

TABLE 4

Treatment Formulations for Testing

| Formula | Anti-Oxidant | Grams added | Grams Active AOX |
|---|---|---|---|
| 1 (main) | Baicalin | 0.2 or 0.4 | 0.1 or 0.2 |
| 2 | Baicalin | 0.1 or 0.4 | 0.1 or 0.4 |
| 3 | Pine Extract | 0.4 | 0.4 |
| 6 | Ferulic Acid | 0.18 | 0.18 |
| 9 | Ellagic Acid | 0.14 or 0.28 | 0.14 or 0.28 |
| Comparative | | 4 g | NA |

Example 1: Sensorial Evaluation of Inventive and Comparative Formulations

The results of testing according to the sensorial test protocols are provided in Table 5.

TABLE 5

Sensorial Data - a rank based system. 1 = best, 3 = worst, (n = 4)

| Sample | Smoothness | Softness | Discipline | Wet Combability |
|---|---|---|---|---|
| Control (no additive) | 3 | 3 | 3 | 3 |
| Comparative | 2 | 2 | 2 | 2 |
| Formula 1 | 1 | 1 | 1 | 1 |
| Formula 2 | 1 | 1 | 1 | 1 |
| Formula 3 | 1 | 1 | 1 | 1 |
| Formula 6 | 1 | 1 | 1 | 1 |
| Formula 9 | 1 | 1 | 1 | 1 |

Sensorial evaluations demonstrate that the Inventive Formulas confer softness, smoothness, discipline and wet combability to the fiber after treatment in comparison to swatches treated with the color altering composition without antioxidant, and compared with comparative (commercial additive for chemical treatments) containing maleic acid and ethanolamine.

Example 2: Miniature Tensile Testing (MTT) and Amino Acid Analysis 15 g of commercial bleach powder is mixed with 15 g of a commercial bleach developer (either 30 or 40V) to which 0.4 g of Formula 1 is added. This bleach mixture is applied to Bleached Swatches (obtained from International Hair Import Products) for a minimum of 50 minutes, or until the treatment and control had matching lifts as measured by $L^*a^*b$. The swatches are rinsed and shampooed three times before being blown dry.

Swatches were then tested via Miniature Tensile Tester (MTT) and Amino Acid Analysis (AAA). The results demonstrate that the inventive formula provides less damaged hair after bleaching than the control system without treatment. Both Elastic Modulus and Break Stress are greater when the inventive formula is used indicating stronger fiber. Additionally, less cysteic acid is formed and less tyrosine is oxidized when the inventive formula is used indicating less oxidative damage.

Example 2A: Miniature Tensile Tester (MTT)

TABLE 6

Modulus and Tensile Performance Post Treatment

| Treatment | n (fibers) | Elastic Modulus | Break Stress |
|---|---|---|---|
| None | 45 | 687.2 (±139.3) | 92.2 (±17.5) |
| Formula 1 | 50 | 865 (±177.1) | 121.4 (±19.9) |

Example 2B: Amino Acid Analysis

TABLE 7

Percent Change in AA Content Post Treatment

| | % Difference from Control (Cysteic Acid) | % Difference from Control (Tyrosine) |
|---|---|---|
| Formula 1 | 12.2 | −66.7 |

% Difference = (Control − Formula)/[(Control + Formula)/2]*100

Raw Materials

Sodium Silicate, *Pinus Pinaster* Bark/Bud Extract, *Scutellaria Baicalensis* Root Extract, Dihydrochalone, Ferulic Acid, Zinc PCA, Polydatin, Ellagic Acid, Matrix Light Master Bleach Powder While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hair treatment composition comprising:
   an antioxidant component consisting of:
      at least one polyphenol selected from the group consisting of baicalin, pine bark extract, polydatin, and ellagic acid; and
      optionally, sodium silicate; and
   a color altering system comprising:
      a bleach composition comprising at least one oxidant; and
      a developer,
   wherein the color altering system does not include a colorant selected from oxidative dye precursors, and
   wherein the antioxidant component is present in an amount selected to confer protection to keratinous material from damaging effects of the bleach composition when the treatment composition is applied to keratinous material and thereby enhance and protect one or more sensorial features, and preserve the mechanical properties and native amino acid structure of the keratinous material.

2. A hair treatment composition according to claim 1, wherein the at least one oxidant is selected from persulfates, perborates, percarbonates, peracids, bromates, their salts, and mixtures thereof, and the developer comprises at least one oxidizing agent selected from hydrogen peroxide, enzymes, and mixtures thereof.

3. A hair treatment composition according to claim 1, wherein the antioxidant component comprises the baicalin.

4. A hair treatment composition according to claim 3, wherein the antioxidant component also comprises the pine bark extract.

5. A hair treatment composition according to claim 1, comprising from about 0.1 to about 5.0%, by weight of the at least one polyphenol, based on the total weight of the combination of the antioxidant component and the bleach composition.

6. A hair treatment composition of claim 5, comprising one or more of at least one cosmetically acceptable carrier chosen from volatile organic solvents, non-volatile organic solvents, water and mixtures thereof, and at least one auxiliary ingredient selected from propellants, emulsifiers, rheology modifiers, film forming agents, neutralizing agents, humectants, conditioning agents, plasticizers, coalescers, fillers, dyes, waxes, surfactants, preserving agents, oils, fragrances, sunscreens, sequestering agents, softeners, antifoams, basifying agents, wetting agents, spreading agents, dispersants, pigments, proteins, ceramides, vitamins, clays, colloidal minerals, nacreous agents, peptizers, preserving agents, reducing agents, oxidizing agents, pH adjusters, silicones, plant extracts, paraffins, fatty acids, and mixtures thereof.

7. A method of treating a keratinous material, comprising:
applying to the keratinous material a hair treatment composition comprising at least one color altering system component selected from the group consisting of: a bleach comprising at least one oxidant; a developer; a colorant selected from oxidative dye precursors and direct dyes; the bleach and the developer; and the colorant selected from oxidative dye precursors and direct dyes and a developer; and, an antioxidant component comprising at least one polyphenol selected from the group consisting of baicalin, pine bark extract, polydatin, and ellagic acid, and the antioxidant component present in an amount effective to confer protection when the treatment composition is applied to keratinous material and thereby enhance and protect one or more sensorial features, and preserve the mechanical properties and native amino acid structure of the keratinous material.

8. A method of treating a keratinous material according to claim 7, wherein the at least one antioxidant compound of the antioxidant component is applied together with the at least one color altering system component.

9. A method of treating a keratinous material according to claim 7, wherein the antioxidant compound of the antioxidant component is applied separately from each of the bleach and the developer of the color altering system.

10. A method of treating a keratinous material according to claim 7, wherein the antioxidant compound of the antioxidant component is applied together with only the bleach of the color altering system, and the developer of the color altering system is separately applied.

11. A method of treating a keratinous material according to claim 7, wherein the color altering system component comprises the bleach and the developer.

12. A method of treating a keratinous material according to claim 11, wherein the antioxidant component is applied separately from each of the bleach and the developer.

13. A method of treating a keratinous material according to claim 7, wherein the color altering system component comprises a colorant and a developer.

14. A method of treating a keratinous material according to claim 13, wherein the antioxidant component is applied separately from each of the colorant and the developer.

15. A method of treating a keratinous material according to claim 7, wherein the keratinous material is heated and the antioxidant component is applied to the keratinous material before heating or during heating or after heating the material, followed by application of the color altering system, or wherein the keratinous material is heated and the antioxidant component comprising at least one antioxidant compound is applied to the keratinous material together with only one of the bleach and the developer before heating or during heating or after heating the material, followed by application of the other component(s) of the color altering system.

16. A method of treating a keratinous material according to claim 7, wherein one or more of the components of the composition is heated and then applied to the keratinous material.

17. A method according to claim 7, wherein the application of the treatment composition to the keratinous material is at least a one step process selected from
a one-step treatment process, wherein the composition comprising the antioxidant component is provided as a premix, and each of the at least one component of the color altering system is provided as a separate premix, and the treatment composition is prepared by combining and mixing the provided premixes, whereby the mixed treatment composition is applied onto the keratinous material;
a one-step treatment process, wherein the composition comprising the antioxidant component together with one or more of the at least one component of the color altering system is provided as a premix, and any one or more of the at least one component of the color altering system is provided as a separate premix, and the treatment composition is prepared by combining and mixing the provided premixes, whereby the mixed treatment composition is applied onto the keratinous material;
a one-step treatment process, wherein the at least one component of the color altering system comprises the bleach and the developer, and wherein the composition comprising the antioxidant component together with the bleach is provided as a premix, and the developer is provided as a separate premix, and the treatment composition is prepared by combining and mixing the provided premixes, whereby the mixed treatment composition is applied onto the keratinous material;
a one-step treatment process, wherein the at least one component of the color altering system comprises a colorant and a developer, and wherein the composition comprising the antioxidant component together with the colorant is provided as a premix, and the developer is provided as a separate premix, and the treatment composition is prepared by combining and mixing the provided premixes, whereby the mixed treatment composition is applied onto the keratinous material;
a two-step treatment process, wherein the at least one component of the color altering system is selected from the group consisting of: the bleach and the developer, and a colorant and a developer, and wherein the composition comprising the antioxidant component is provided as a premix, and each of the components of the color altering system are provided as separate premixes, and the treatment composition is prepared by combining and mixing the provided premixes, whereby the antioxidant premix is first applied to the keratinous material, followed by the mixed color altering system;

a two-step treatment process, wherein the at least one component of the color altering system comprises the bleach and the developer, and wherein the composition comprising the antioxidant component is provided as a premix, and each of the bleach and developer components of the color altering system are provided as separate premixes, and the treatment composition is prepared by combining and mixing the antioxidant component premix and one of the bleach and developer premixes, whereby the antioxidant mixture is first applied to the keratinous material, followed by the remaining premix;

a two-step treatment process, wherein the at least one component of the color altering system comprises the bleach and the developer, and wherein the composition comprising the antioxidant component is provided as a premix, and each of the bleach and developer components of the color altering system are provided as separate premixes, and the treatment composition is prepared by combining and mixing the antioxidant component premix and the bleach premix, whereby the antioxidant mixture is first applied to the keratinous material, followed by the developer premix;

a two-step treatment process, wherein the at least one component of the color altering system comprises a colorant and a developer, and wherein the composition comprising the antioxidant component is provided as a premix, and each of the colorant and developer components of the color altering system are provided as separate premixes, and the treatment composition is prepared by combining and mixing the antioxidant component premix and one of the colorant and developer premixes, whereby the antioxidant mixture is first applied to the keratinous material, followed by the remaining premix;

a two-step treatment process, wherein the at least one component of the color altering system comprises a colorant and a developer, and wherein the composition comprising the antioxidant component is provided as a premix, and each of the colorant and developer components of the color altering system are provided as separate premixes, and the treatment composition is prepared by combining and mixing the antioxidant component premix and the colorant premix, whereby the antioxidant mixture is first applied to the keratinous material, followed by the developer premix; a three-step process, wherein the at least one component of the color altering system is selected from the group consisting of: the bleach and the developer, and a colorant and a developer, and wherein the composition comprising the antioxidant component is provided as a premix, and each of the bleach or colorant and developer components of the color altering system are provided as separate premixes, whereby at the time of use, each of the premixes is applied separately to the keratinous material in any order; and a multi-step treatment process, wherein the at least one component of the color altering system is selected from the group consisting of: the bleach and the developer, and a colorant and a developer, and wherein the composition comprising the antioxidant component is provided as a premix, and each of the bleach or colorant and developer components of the color altering system are provided as separate premixes, and a portion of the antioxidant premix is combined with one or both of the bleach or colorant and the developer, individually, and whereby a portion of the antioxidant premix is first applied to the keratinous material, followed in any order, sequentially or in combination, by the one or more mixtures, and bleach or colorant and developer.

18. A method according to claim 14, further comprising a pre-treatment step that comprises applying to the keratinous material a premix comprising the antioxidant component.

19. An article of manufacture comprising a kit in pre-packaged form for altering the color of hair, the kit comprising:
a hair treatment composition comprising:
an antioxidant component consisting of:
at least one polyphenol selected from the group consisting of baicalin, pine bark extract, polydatin, and ellagic acid; and
optionally, sodium silicate; and
a color altering system comprising:
a bleach composition comprising at least one oxidant; and
a developer,
wherein the color altering system does not include a colorant selected from oxidative dye precursors,
wherein the antioxidant component, and each component of the color altering system, is provided in separate packages, and
optionally, at least one solvent composition that is separately packaged,
whereby at the time of use, the contents of each of the packages may be one or more of combined and agitated to form at least one mixture, and directly applied to the keratinous material, in any order, and
wherein the antioxidant component is provided in an amount selected to confer protection to keratinous material from damaging effects of the bleach composition when the treatment composition is applied to keratinous material and thereby enhance and protect one or more sensorial features, and preserve the mechanical properties and native amino acid structure of the keratinous material.

20. An article of manufacture according to claim 19, wherein the at least one oxidant is selected from persulfates, perborates, percarbonates, peracids, bromates, their salts, and mixtures thereof, and the developer comprises at least one oxidizing agent selected from hydrogen peroxide, air enzymes, and mixtures thereof, and
wherein the antioxidant component and each component of the color altering system are packaged separately, and
optionally, at least one solvent composition that is separately packaged,
whereby at the time of use, the contents of each of the packages may be one or more of combined and agitated to form at least one mixture, and directly applied to the keratinous material, in any order.

21. An article of manufacture according to claim 19, wherein the at least one polyphenol is selected from the group consisting of:
the baicalin, present by weight, from about 0.7 to about 2.3%, based on the total weight of the composition comprising the antioxidant component and the bleach component;
the pine bark extract, present by weight, from about 0.7 to about 2.3%, based on the total weight of the composition comprising the antioxidant component and the bleach component; and the ellagic acid, present by weight, from about 0.9 to about 1.8%, based on the total weight of the composition comprising the antioxidant component and the bleach component.

22. An article of manufacture according to claim 21, wherein the kit includes:
   at least one premix package of the antioxidant component; and
   separate premix packages of each of the developer, and the bleach composition.

23. A hair treatment composition according to claim 1, wherein the at least one polyphenol is selected from the group consisting of:
   the baicalin present by weight, from about 0.7% to about 2.3%;
   the pine bark extract, present by weight, from about 0.7% to about 2.3%; and
   the ellagic acid, present by weight, from about 0.9% to about 1.8%,
   each, based on the total weight of the of the combination of the antioxidant component and the bleach composition.

24. A hair treatment composition according to claim 1,
   wherein the antioxidant component comprises baicalin, present by weight, from about 0.7 to about 2.3%, based on the total weight of the of the combination of the antioxidant component and the bleach composition, and
   wherein the at least one oxidant is selected from persulfates, perborates, percarbonates, peracids, bromates, their salts, and mixtures thereof, and the developer comprises at least one oxidizing agent selected from hydrogen peroxide, enzymes, and mixtures thereof.

25. A hair treatment composition according to claim 1,
   wherein the antioxidant component comprises baicalin, present by weight, from about 1.25% to about 2.5%, based on the total weight of the of the combination of the antioxidant component and the bleach composition, and
   wherein the at least one oxidant is selected from persulfates, perborates, percarbonates, peracids, bromates, their salts, and mixtures thereof, and the developer comprises at least one oxidizing agent selected from hydrogen peroxide, enzymes, and mixtures thereof.

* * * * *